United States Patent
Zhao et al.

(10) Patent No.: US 9,420,541 B2
(45) Date of Patent: Aug. 16, 2016

(54) UPLINK POWER CONTROL METHOD AND DEVICE BASED ON GENETIC ALGORITHM IN COMMUNICATION NETWORK

(71) Applicant: ZTE Corporation, Shenzhen (CN)

(72) Inventors: Yan Zhao, Shenzhen (CN); Ying Sun, Shenzhen (CN); Jian Wang, Shenzhen (CN); Bindi Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/434,755

(22) PCT Filed: Aug. 28, 2013

(86) PCT No.: PCT/CN2013/082497
§ 371 (c)(1),
(2) Date: Apr. 9, 2015

(87) PCT Pub. No.: WO2014/056363
PCT Pub. Date: Apr. 17, 2014

(65) Prior Publication Data
US 2015/0289210 A1 Oct. 8, 2015

(30) Foreign Application Priority Data
Oct. 9, 2012 (CN) .......................... 2012 1 0379756

(51) Int. Cl.
*H04W 52/14* (2009.01)
*G06N 3/12* (2006.01)
(Continued)

(52) U.S. Cl.
CPC ............ *H04W 52/146* (2013.01); *G06N 3/126* (2013.01); *H04B 17/391* (2015.01); *H04W 52/225* (2013.01); *H04W 52/241* (2013.01); *H04W 52/242* (2013.01); *H04W 52/367* (2013.01)

(58) Field of Classification Search
CPC ... G06N 3/126; H04B 17/391; H04W 52/146; H04W 52/225; H04W 52/241; H04W 52/242; H04W 52/367

USPC .......... 455/522, 69, 507, 452, 453, 436, 447, 455/127.1, 68, 63.1; 370/329, 335, 252, 370/351, 466, 227, 315, 293, 328, 337, 370/370; 340/310.15; 706/13, 12, 14, 46
See application file for complete search history.

(56) References Cited

U.S. PATENT DOCUMENTS 5,651,099 A * 7/1997 Konsella ................. H03M 7/30
706/13
6,957,200 B2 * 10/2005 Buczak .................. G06N 3/126
706/13

(Continued)

FOREIGN PATENT DOCUMENTS

| CN | 102448071 A | 10/2012 |
|----|-------------|---------|
| CN | 102711266 A | 10/2012 |
| CN | 102892188 A | 1/2013 |

OTHER PUBLICATIONS

International Search Report for corresponding application PCT/CN2013/082497 filed Aug. 28, 2013: Mail date Nov. 28, 2013.

(Continued)

*Primary Examiner* — Tan H Trinh
(74) *Attorney, Agent, or Firm* — Cantor Colburn LLP

(57) ABSTRACT

Provided are an uplink power control method and device based on a genetic algorithm in a communication network. The method includes: modelling a communication network to obtain a theoretically optimal mobile terminal transmission power expression; determining a fitness function in combination of a genetic algorithm; determining the number of bits of a binary string of a variable; initializing populations; returning an actual value from the binary string to serve as an actual variable; and obtaining the most robust gene and the weakest gene in a chromosome according to the fitness function, designing a genetic operator and determining operating parameters of the genetic algorithm according to the most robust gene and the weakest gene. Using the solution enables a base station to properly indicate to dynamically adjust the uplink transmission power of a home mobile terminal, thereby ensuring excellent system performance of the communication network.

18 Claims, 3 Drawing Sheets

(51) Int. Cl.
*H04W 52/24* (2009.01)
*H04W 52/22* (2009.01)
*H04B 17/391* (2015.01)
*H04W 52/36* (2009.01)

(56) References Cited

U.S. PATENT DOCUMENTS

| | | | | |
|---|---|---|---|---|
| 7,092,378 | B1* | 8/2006 | O'Neil | G06N 3/126 370/351 |
| 7,289,972 | B2* | 10/2007 | Rieser | H04B 1/0003 706/12 |
| 7,668,788 | B2* | 2/2010 | Wren | G06N 3/126 700/100 |
| 7,890,568 | B2* | 2/2011 | Belenki | G06N 3/126 709/200 |
| 8,838,510 | B2* | 9/2014 | Baughman | G06N 3/12 706/13 |
| 2002/0136192 | A1* | 9/2002 | Holma | H04W 52/265 370/347 |
| 2003/0050902 | A1* | 3/2003 | Buczak | G06N 3/126 706/13 |
| 2003/0171122 | A1* | 9/2003 | Kim | H04W 16/10 455/452.1 |
| 2004/0167721 | A1* | 8/2004 | Murakawa | G06N 3/126 702/20 |
| 2004/0258026 | A1* | 12/2004 | Lau | H04B 7/06 370/335 |
| 2005/0049983 | A1* | 3/2005 | Butler | G06N 3/086 706/13 |
| 2007/0210899 | A1* | 9/2007 | Kato | H04B 1/18 333/17.3 |
| 2007/0298821 | A1* | 12/2007 | Bush | H04W 84/20 455/507 |
| 2008/0075033 | A1* | 3/2008 | Shattil | H04B 7/026 370/328 |
| 2008/0154808 | A1* | 6/2008 | Grieco | G06N 3/12 706/13 |
| 2008/0154809 | A1* | 6/2008 | Stockwell | G06N 3/12 706/13 |
| 2008/0168015 | A1* | 7/2008 | Thie | G06Q 10/00 706/46 |
| 2010/0124930 | A1* | 5/2010 | Andrews | H04W 16/10 455/436 |
| 2010/0137017 | A1* | 6/2010 | Lin | H04W 52/08 455/522 |
| 2010/0296591 | A1* | 11/2010 | Xu | H04B 7/0613 375/259 |
| 2012/0213061 | A1* | 8/2012 | Chen | H04W 16/14 370/227 |
| 2013/0114562 | A1* | 5/2013 | Seo | H04W 52/146 370/329 |
| 2013/0285234 | A1* | 10/2013 | Uhlemann | H01L 23/473 257/712 |
| 2013/0308570 | A1* | 11/2013 | Xu | H04B 7/024 370/329 |

OTHER PUBLICATIONS

European Search Report for corresponding application EP13845013; Report dated Aug. 31, 2015.

Habib I et al, Efficient radio Resource Control in Wireless Networks:, IEE Transactions on Wireless Communications, IEE Service Center, Piscataway, NJ, vol. 3, No. 6, Nov. 1, 2004, pp. 2385-2395, XP011124324.

Qingyang Song, "A Multi-Objective Power Control Scheme Based on Genetic Algorithm", 2012 8th International Conference on Wireless Communications, Networking and Mobile Computing, Shanghai China, Sep. 2012, pp. 1-4, XP032342535.

* cited by examiner

UPLINK POWER CONTROL METHOD AND DEVICE BASED ON GENETIC ALGORITHM IN COMMUNICATION NETWORK

TECHNICAL FIELD

The disclosure relates to the technical field of communications, and in particular to an uplink power control method and device based on a genetic algorithm in a communication network.

BACKGROUND

At present, with the booming of mobile broadband technologies in communication networks, the network traffic presents an explosive growth. In order to meet higher and higher requirements that people have for mobile communications in the future, to get rid of the constraint of the site and environments and to realize ubiquity of networks in a real sense, how a communication network provides high speed data services to a user and supports the user to implement seamless roaming services in various types of wireless communication systems, and especially provides heat compensation and blind compensation control in traffic hotspots and areas having poor coverage appear to be particularly important.

It is very difficult for the spectrum under the existing network deployment mainly based on macro base stations to meet the capacity requirements. For this purpose, it would be a better solution at present to introduce small base stations into a communication network to realize common-frequency networking of a multi-layer heterogeneous network, and at the same time this also brings the fusion and development of multiple types of wireless communication networks. A network like this which does not have the same transmission properties and communication protocols is called a wireless heterogeneous network (Heterogeneous Net). On one hand, the Heterogeneous Net effectively reduces the operation and maintenance costs of the operator; on the other hand, the service experience of a terminal user is also apparently improved.

In a current wireless communication network, no matter it is a traditional homogeneous network or a multi-network converged heterogeneous network, the target thereof is to provide a larger system capacity and better quality of service for mobile users. In order to effectively reduce interferences to a system, improve the system capacity and ensure the quality of a communication link, it is required to perform reasonable dynamic allocation on limited wireless resources such as frequency bands, transmission power and channels, so that the resources of the system can be sufficiently utilized and the performance of the system can be optimized, thereby realizing the above-mentioned target.

Among the numerous key wireless technologies, power control is a difficulty and is also one of the key points at the same time. The main purpose of power control is to suppress interferences by means of controlling the transmission power of a terminal or a base station. The basic principle is to dynamically adjust the transmission power of a transmitter in real time and enable the received power at a receiver to be as small as possible on the premise that normal communication quality requirements are satisfied. If all the transmitters in the system use the minimum transmitting power which just meets this requirement, then the interference in the system will be greatly reduced without reducing the receiving quality of a single receiver. When the decreased amplitude of the interference power is greater that the decreased amplitude of the transmitting power, the capacity of the entire system can be increased. In addition, power control also functions to save energy in the communications. For a user of a mobile terminal, if a normal communication with a base station can be established using a transmission power as small as possible, the discharging time of a battery can certainly be prolonged. Therefore, a reasonable and effective power control solution will enable the entire system to present characteristics of high capacity and high quality of service.

Power control is generally divided into uplink power control and downlink power control, and the uplink power control and the downlink power control are performed independently. Traditional power control methods may typically be divided into two types as follows: one is a power control method based on optimization and the other one is a power control method based on feedback.

With regard to a power control algorithm based on optimization, an accurate model of the entire system needs to be known, and the system performance is described by means of a target function. The calculation of the transmission power of each mobile terminal is completed under the target of achieving an optimal system performance, and then the calculated power value is loaded to the mobile terminal in real time. This method has accurate control and has an explicitly meaningful optimized target function, however, the calculation amount thereof is huge, and the method is not suitable for dynamic environments. When environment parameters change, an optimal solution obtained previously does not work any more, especially when the dimension of the system and the number of users change, a system model needs to be re-established and optimized once again. In this case, the real-time completion of a task is difficult to implement, and therefore the power control algorithm based on optimization has only theoretic study value rather than any practical significance.

In addition, the power control algorithm based on feedback has flexible control and is easy to implement. However, the determination of a step-length is largely depended on experience knowledge, and the algorithm lacks theoretical foundation. If an inappropriate step-length is chosen, it will give rise to large over adjustment or a long stabilization time, thereby influencing the signal to interference ratio of each user and the system stability. Moreover, this power control algorithm based on feedback determines the trend of change of the transmission power according to the change of quality of service for a single user, without involving the concept of the overall optimization of the system, and thus it is very difficult to make the system to arrive at the overall optimization state.

At present, typical power control algorithms are generally divided into the following types: a traditional power control algorithm with a fixed step-length, a power control algorithm based on the measurement of received signal strength, a power control algorithm based on the transmission quality of a communication link (such as SIR (Signal to Interference Ratio) and BER (Bit Error Rate)) and a power control algorithm based on random theories, etc., which will be briefly described below respectively.

(I) A Traditional Power Control Algorithm with a Fixed Step-Length

Take the uplink as an example, if the transmission power of a mobile station is set to P(t) which is adjusted by a step-length $\Delta p$ in each power control period $T_p$:

$$P(t)=P(t-T_p)\pm\Delta p;$$

where step-length $\Delta p$ is fixed to 1 dB.

This power control algorithm allows a base station to send a power control command, and a user adjusts a transmitting power with a fixed step-length according to this control command. The power changing process is just link "ping-pong" control, as a result, this power control algorithm has a poor stability, and cases of excessive over adjustment or too short stabilization time may easily occur.

(II) A Power Control Algorithm Based on the Measurement of Received Signal Strength The acquisition of the estimation of signal strength is relatively easy for most of mobile communication systems, and thus most of the algorithms are performed around the measurement based on the received signal strength. Likewise, in the algorithm, with regard to the uplink, the received signal strength of a receiver of a mobile station is $C_i(t)$, which has a linear relationship with the transmission power of the mobile station $P_i(t)$, then this static control algorithm based on the measurement of the received signal strength is expressed using the following formula:

$$P_i(t+1) = \alpha + \beta C_i(t);$$

where $\beta$ is a constant greater than zero; and in the algorithm, the selection of its parameters $\alpha$, $\beta$ has vital influences on the system performance.

(III) A power control algorithm based on the transmission quality of a communication link The transmission quality of the communication link can be measured using the signal-to-noise ratio (SIR) or bit error ratio (BER). Now a centralized power control algorithm based on SIR balance is taken as an example to introduce such algorithm.

For a multi-cell multi-user cellular system, the number of cell base stations in the system is set to N, and each cell has $M_n$ (n=1, 2, 3 . . . N) mobile users. The uplink is taken as an example, if the signal-interference ratio of a mobile user i belonging to the $k^{th}$ cell is denoted by $\Gamma_i(t)$, thus:

$$\Gamma_i = \frac{G_{ki} P_i}{\sum_{j \neq i} G_{kj} P_j + \eta_i} \quad k = 1, 2, 3 \ldots N;$$

where $G_{ki}$ a link gain from the mobile user i to base station k, and $P_i$ is the transmission power of the user i. The threshold value of SIR required under the condition of assurance of the quality of the communication link is set to $\gamma_i$, then to ensure the communication quality, there should be:

$$\Gamma_i \geq \Gamma_i \geq \gamma_i;$$

and if the impact of noise is not taken into consideration, then:

$$\Gamma_i = \frac{G_{ki} P_i}{\sum_{j \neq i} G_{kj} P_j} = \frac{P_i}{\sum_{j \neq i} Z_{kj} P_j};$$

where $$Z_{kj} = \begin{cases} \frac{G_{kj}}{G_{ki}} & j \neq k \\ 0 & j = k \end{cases}$$

is the normalized link gain matrix, the following is obtained after substituting $Z_{kj}$ in the above formula:

$$P_i \geq (\gamma_i)(\Sigma P_j Z_{ij});$$

written in the matrix form:

$$P \frac{1}{\gamma} \geq PZ;$$

where $Z=Z_{kj}$; $P=(P_1, P_2, P_3, \ldots P_N)^T$, $P>0$; $\gamma=\gamma_1, \gamma_2, \gamma_3, \ldots \gamma_N)^T$. The power control algorithm based on SIR balance determines the assurance transmission power vector P utilizing some measurement information. Since gains of all the links need to be known in the process of resolving the power P, this algorithm is a centralized power control algorithm. The centralized power control algorithm leads to good control performances, and can be considered as the optimal power control. However, the centralized power control algorithm has one drawback, i.e.: the calculation amount for obtaining a normalized link matrix at a certain moment is relatively large.

(IV) A Power Control Algorithm Based on Random Theories

Ulukus and Yates propose an extended power control algorithm based on random theories, which algorithm is expressed with the following formula:

$$P_i(t+1) = [1 - \alpha_i(1 + \gamma_i)] P_i(t) + \alpha_i v_i(t) \frac{\gamma_i}{G_{ik}};$$

where $G_{ik}$ is the channel gain between a mobile station i and a base station k which establishes a connection with the mobile station i; $\alpha_n$, n=1, 2, 3 . . . ., satisfies the condition $\alpha_i = \epsilon$ or $$\alpha_i = \frac{\varepsilon}{t},$$

$\epsilon$ being a small positive constant; $v_i(t)$ is an SMF (Squared Matched Filter) output of the mobile station i at a moment t, and it is a random noise with Gauss distribution which has one mean value of zero and variance of $\sigma^2$.

In addition to the four types of basic power control algorithms generalized above, branch researches of many other power control algorithms are not excluded. On the whole, most of the power control algorithms are improvement implemented on the basis of the traditional power control algorithms. On the basis that various types of algorithms have different emphases, some are embodied in the aspect of hardware feasibility, some focus on the improvement of the overall network performance, and some mainly focus on the simplification of the model to realize simple calculation, etc. On the one hand, these traditional power control algorithms have certain reliability and stability after a long practice process; on the other hand, they are confirmed to show certain limitations and complexity in a long term evolution communication network.

SUMMARY

In order to improve the quality of service (QoS) of an uplink communication link of a target base station and reduce interference influences on other base stations as much as possible at the same time, an uplink power control method and device based on a genetic algorithm in a communication network are provided in the embodiments of the disclosure.

The embodiments of the disclosure mainly determine a fitness function and sets up an evaluation function utilizing the global search capability of the genetic algorithm on the basis of the traditional power control criteria based on the transmission quality of a communication link, so that the system can calculate the transmission power of a mobile terminal at a certain moment as rapidly as possible, thereby ensuring the QoS of the uplink communication link of the target base station while reducing interference influences on other base stations as much as possible.

According to an embodiment of the disclosure, an uplink power control method based on a genetic algorithm in a communication network is provided, including:

A. modelling a communication network to acquire a theoretically optimal transmission power expression of a mobile terminal;

B. determining a fitness function in combination of a genetic algorithm;

C. determining the numbers of bits of binary strings of variables;

D. initializing populations;

E. returning an actual value from the binary string to serve as an actual variable; and F. obtaining the most robust gene and the weakest gene in a chromosome according to the fitness function, and designing a genetic operator and determining operating parameters of the genetic algorithm according to the most robust gene and the weakest gene.

In an example embodiment, in the step A, a vector expression of the theoretically optimal transmission power of the mobile terminal $\hat{P}$ is:

$$\hat{P} = (I-H)^{-1} \eta;$$

where matrix $H = \lfloor h_{nj} \rfloor$, which is an M×M normalized link gain matrix; vector $$\eta = (\delta_n / G_{ni}) \times \gamma'_i,$$

which is a normalized noise power vector, where $\delta_n$ is a heat noise power at a base station n, $G_{ni}$ is a link gain between the $i^{th}$ mobile terminal and the base station n at a certain moment, and $\gamma'_i$ is a target signal to interference ratio (SIR) of the $i^{th}$ mobile terminal.

In an example embodiment, in the step B, for an uplink of a communication system, the determined fitness function is as follows:

$$\mu(t) = \sum_{i=1}^{M} [p_i(t) + \phi(t)];$$

where $\phi(t) = p_i(t) - p_i(t-1)$, and $p_i(t)$ represents a transmission power of the $i^{th}$ mobile terminal at the $t^{th}$ generation.

In another example embodiment, constraint conditions of the fitness function are:

for a demodulation threshold of a signal to interference and noise ratio (SINR) of a received signal:

$$\frac{G_{ni} \times p_i}{I_i} \geq \gamma'_i;$$

for the transmission power of the mobile terminal:

$$0 \leq p_i(t) \leq p_{i\_max};$$

where $I_i$ represents a sum of the power of interference and noise received by the $i^{th}$ mobile terminal, $\gamma'_i$ represents the target SIR of the $i^{th}$ mobile terminal, and $p_{i\_max}$ is a maximum value of the transmission power of the $i^{th}$ mobile terminal.

In another example embodiment, a value range of searching for the transmission power is obtained as follows:

$$\left( \frac{\gamma'_i \times I_i}{G_{ni}} \right) \leq p_i(t) \leq p_{i\_max}.$$

In an example embodiment, the communication network is a homogeneous network or a heterogeneous network.

In an example embodiment, in the step C, the number of bits $m_j$ of the binary string of each variable may be acquired by the following mathematical formulae:

$$2^{m_j-1} < (p_{i\_max} - \alpha) \times 10^n \leq 2^{m_j} - 1;$$

where a lower limit value of searching values for the variable is $$\alpha = \frac{\gamma'_i \times I_i}{G_{ni}}$$

and the value range of the searching values for the variable is $\lfloor \alpha, P_{i\_max} \rfloor$, and when the accuracy of determination is the $n^{th}$ decimal places, each variable may be divided into at least $(p_{i\_max} - \alpha) \times 10^n$ parts.

In another example embodiment, the calculated number of bits $m_j$ of the binary string of each variable is the length of each gene, and the length of the chromosome is equal to the length of each gene multiplying the number of genes.

In an example embodiment, in the step D, an initial population is determined randomly from the range of solutions; and on the basis that the length of the chromosome has been obtained, with regard to the generation of 0 and 1 chromosome strings based on this length, K groups can be generated randomly according to a preset number of initial populations.

In another example embodiment, after a processing period has exceeded a preset time period T, move on to step C to calculate the number of bits $m_j$ of the binary string, and if the calculated number of bits $m_j$ of the binary string is the same as an $m_j$ calculated in a previous period, then an optimal solution obtained by means of iteration in the previous period is continued to be adopted and an initial population for a next period is generated by means of operations of crossover and mutation; and if the $m_j$ has changed, then a new $m_j$ length is generated again to initialize a random population.

In an example embodiment, in the step E, returning an actual value from the binary string to serve as the actual variable can be realized by adopting the following formulae:

$$p_i = \alpha + \text{decimal(substring)} \times \frac{p_{i\_max} - \alpha}{2^{m_j} - 1};$$

where decimal(substring) represents a decimal numerical value of the variable $P_i$.

In an example embodiment, in the step F, roulette wheel selection is adopted to obtain the most robust gene and the weakest gene in the chromosome according to the fitness function, and the genetic operator is designed and the operating parameters of the genetic algorithm are determined according to the most robust gene and the weakest gene, the step F includes:

F1, calculating the fitness function eval($U_k$) according to a decimal numerical value $U_k$ corresponding to each randomly generated binary chromosome, wherein this parameter K is mainly used for embodying random controllability of the genetic algorithm and an initial value of this parameter is artificially configurable:

$$eval(U_k)=\mu(t) k=1,2,3,\ldots;$$

F2, calculating a sum of the fitness of the populations:

$$F = \sum_{k=1}^{K} eval(U_k);$$

F3, calculating a selection probability $Y_k$ corresponding to the $U_k$ of each chromosome:

$$Y_k = \frac{eval(U_k)}{F};$$

F4, calculating an accumulation probability $Q_k$ of the $U_k$ of each chromosome:

$$Q_k = \sum_{j=1}^{k} Y_j \quad k = 1, 2, 3 \ldots, K;$$

and

F5, selecting one chromosome of a new population.

In an example embodiment, the step F5 includes:

F51, rotating a roulette wheel K times, with one random number r between [0, 1] being generated by each rotation, r being denoted as a vector having a size of 1×K;

F52, performing screening once utilizing each element of a random number vector to obtain one new population satisfying conditions corresponding to a current random number, if the current random number $r_i \leq Q_1$, then directly selecting the population of the chromosome $U_1$ as an optimal solution selected by the random number; and if $r_i \leq Q_1$ is not satisfied, then comparing whether $Q_k \leq r_i \leq Q_{k+1}$ is satisfied, if so, then selecting a $k^{th}$ initial population, traversing each element in a random number matrix r in sequence, performing recursion until the comparison of all the random numbers is completed, and selecting the $k^{th}$ group of initial population which has the maximum probability of occurrence to serve as an optimum transmission power at current moment t; and F53, if the selected new population $U_k$ is not unique, then comparing a plurality of current groups of $U_k$ in combination of the selection probability, and taking a $U_k$ which has the minimum selection probability as an output of the optimal population of this time.

According to another embodiment of the disclosure, an uplink power control device based on a genetic algorithm in a communication network is provided, including:

a power control component which is configured to model a communication network to acquire a theoretically optimal transmission power expression of a mobile terminal; determine a fitness function in combination of a genetic algorithm; determine the numbers of bits of binary strings of variables; initialize populations; return an actual value from the binary string to serve as an actual variable; and obtain the most robust gene and the weakest gene in a chromosome according to the fitness function, and design a genetic operator and determine operating parameters of the genetic algorithm according to the most robust gene and the weakest gene.

In an example embodiment, a vector expression of the theoretically optimal transmission power of the mobile terminal $\hat{P}$ is:

$$\hat{P}=(I-H)^{-1}\eta;$$

where matrix H=$\lfloor h_{nj} \rfloor$, which is an M×M normalized link gain matrix; vector $$\eta = (\delta_n / G_{ni}) \times \gamma'_i,$$

which is a normalized noise power vector, where $\delta_n$ is a heat noise power at a base station n, $G_{ni}$ is a link gain between the $i^{th}$ mobile terminal and the base station n at a certain moment, and $\gamma'_i$ is a target signal to interference ratio (SIR) of the $i^{th}$ mobile terminal.

In an example embodiment, for an uplink of a communication system, the fitness function determined by the power control component is as follows:

$$\mu(t) = \sum_{i=1}^{M} [p_i(t) + \phi(t)];$$

where $\phi(t)=p_i(t)-p_i(t-1)$, and $p_i(t)$ represents a transmission power of the $i^{th}$ mobile terminal at the $t^{th}$ generation.

In another example embodiment, constraint conditions of the fitness function are:

for a demodulation threshold of a signal to interference and noise ratio (SINR) of a received signal:

$$\frac{G_{ni} \times p_i}{I_i} \geq \gamma'_i;$$

and for the transmission power of the mobile terminal:

$$0 \leq p_i(t) \leq p_{i\_max};$$

where $I_i$ represents a sum of the power of interference and noise received by the $i^{th}$ mobile terminal, $\gamma'_i$ represents the target SIR of the $i^{th}$ mobile terminal, and $p_{i\_max}$ is a maximum value of the transmission power of the $i^{th}$ mobile terminal.

In another example embodiment, a value range of searching for the transmission power is obtained as follows:

$$\left(\frac{\gamma'_i \times I_i}{G_{ni}}\right) \leq p_i(t) \leq p_{i\_max}.$$

In an example embodiment, the communication network is a homogeneous network or a heterogeneous network.

In an example embodiment, the number of bits $m_j$ of the binary string of each variable may be acquired by the following mathematical formulae:

$$2^{m_j-1} < (p_{i\_max}-\alpha) \times 10^n \leq 2^{m_j}-1;$$

where a lower limit value of searching values for the variable is $$\alpha = \frac{\gamma'_i \times I_i}{G_{ni}}$$

and the value range of the searching values for the variable is $\lfloor \alpha, p_{i\_max} \rfloor$, and when the accuracy of determination is the $n^{th}$ decimal places, each variable may be divided into at least $\lfloor \alpha, p_{i\_max} \rfloor$ parts.

In an example embodiment, the calculated number of bits $m_j$ of the binary string of each variable is the length of each gene, and the length of the chromosome is equal to the length of each gene multiplying the number of genes.

In another example embodiment, an initial population is determined randomly from the range of solutions; and on the basis that the length of the chromosome has been obtained, with regard to the generation of 0 and 1 chromosome strings based on this length, K groups can be generated randomly according to a preset number of initial populations.

In another example embodiment, after a processing period has exceeded a preset time period T, the number of bits $m_j$ of the binary string is re-calculated, and if the calculated number of bits $m_j$ of the binary string is the same as an $m_j$ calculated in a previous period, then an optimal solution obtained by means of iteration in the previous period is continued to be adopted and an initial population for a next period is generated by means of operations of crossover and mutation; and if the $m_j$ has changed, then a new $m_j$ length is generated again to initialize a random population.

In an example embodiment, returning an actual value from the binary string to serve as the actual variable may be realized by adopting the following formulae:

$$p_i = \alpha + \text{decimal(substring)} \times \frac{p_{i\_max} - \alpha}{2^{m_j} - 1};$$

where decimal(substring) represents a decimal numerical value of the variable $P_i$.

In an example embodiment, the power control component is configured to adopt roulette wheel selection to obtain the most robust gene and the weakest gene in a chromosome according to the fitness function, and design the genetic operator and determine the operating parameters of the genetic algorithm according to the most robust gene and the weakest gene in the following way:

F1, calculating the fitness function eval($U_k$) according to a decimal numerical value $U_k$ corresponding to each randomly generated binary chromosome, wherein this parameter K is mainly used for embodying random controllability of the genetic algorithm and an initial value of this parameter is artificially configurable:

$$\text{eval}(U_k) = \mu(t) k = 1, 2, 3, \ldots;$$

F2, calculating a sum of the fitness of the populations:

$$F = \sum_{k=1}^{K} \text{eval}(U_k);$$

F3, calculating a selection probability $Y_k$ corresponding to the $U_k$ of each chromosome:

$$Y_k = \frac{\text{eval}(U_k)}{F};$$

F4, calculating an accumulation probability $Q_k$ of the $U_k$ of each chromosome:

$$Q_k = \sum_{j=1}^{k} Y_j \quad k = 1, 2, 3 \ldots, K;$$

and

F5, selecting one chromosome of a new population.

In another example embodiment, the power control component is configured to execute the step F5 in the following way:

F51, rotating a roulette wheel K times, with one random number r between [0, 1] being generated by each rotation, r being denoted as a vector having a size of 1×K;

F52, performing screening once utilizing each element of a random number vector to obtain one new population satisfying conditions corresponding to a current random number, if the current random number $r_i \leq Q_1$, then directly selecting the population of the chromosome $U_1$ as an optimal solution selected by the random number; and if $r_i \leq Q_1$ is not satisfied, then comparing whether $Q_k \leq r_i \leq Q_{k+1}$ is satisfied, if so, then selecting a $k^{th}$ initial population, traversing each element in a random number matrix r in sequence, performing recursion until the comparison of all the random numbers is completed, and selecting the $k^{th}$ group of initial population which has the maximum probability of occurrence to serve as an optimum transmission power at current moment t; and F53, if the selected new population $U_k$ is not unique, then comparing a plurality of current groups of $U_k$ in combination of the selection probability, and taking a $U_k$ which has the minimum selection probability as an output of the optimal population of this time.

It can be seen from the above-mentioned technical solutions of the disclosure that, in the technical solutions provided in the disclosure, an algorithm for utilizing a genetic algorithm to obtain uplink power control in a communication network is proposed in combination of a global search algorithm having an optimal solution. This proposed power control algorism is practical and realizes power control with certain complexity. Using the solution enables a base station to properly indicate to dynamically adjust the uplink transmission power of a home mobile terminal, to reduce the interference to other base stations in a homogeneous or heterogeneous network in the communication network, and can ensure the uplink QoS of the mobile terminals of the whole network under the target base station, thereby ensuring excellent system performance of the communication network.

Figure 1:
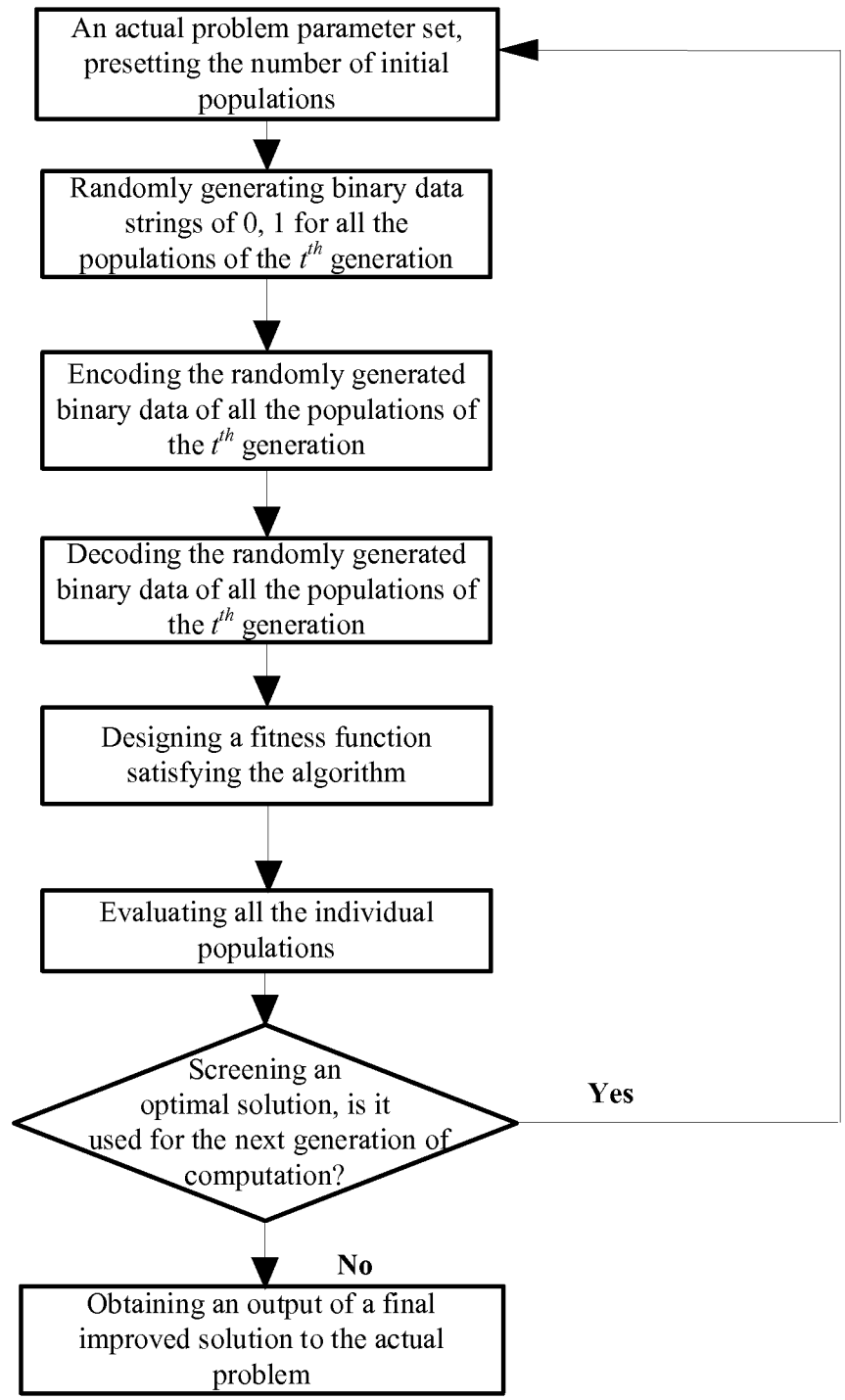
FIG. 1 is a schematic flowchart of a genetic algorithm.

Objective implementations, function characteristics and excellent effects of the disclosure will be further illustrated below in combination with particular embodiments and appended drawings.

DETAILED DESCRIPTION OF THE EMBODIMENTS

The technical solution of the disclosure is described below with reference to the accompanying drawings and embodiments in detail, to enable the skilled personnel in the field to better understand the disclosure and implement; but the embodiments are not intended to limit the disclosure.

In general, the type of an algorithm adopted by a power control technology in a communication network may directly affect the effects of power control. The implementation complexity of the algorithm is often closely related to the system performance, i.e.: the greater the improvement to the system performance is, the higher the complexity of the power control algorithm is, and the higher the hardware implementation cost is. Based on this, the embodiments of the disclosure combine some of the principles and research results of the control theory with power control algorithms and provide a new thought to improve the performance of the power control technologies. This is also the foundation of the disclosure and the original intention of the introduction of the genetic algorithm.

It is noted that the embodiments of the disclosure main study uplink power control, i.e. enabling a target base station to obtain stable received signal strength by dynamically adjusting the transmission power of a mobile terminal according to an instruction of the base station for the terminal, and at the same time, reducing interferences to the common frequency and adjacent frequencies and degrading the power consumption of the mobile terminal.

The genetic algorithm (GA) is a computation model which simulates the biologic evolution process of natural selection and genetic mechanisms of Darwin's biological evolutionism, and is a method for searching a relatively optimal solution in the range satisfying search conditions by simulating a natural evolution process. In the embodiments of the disclosure, genetic algorithm principles are utilized, and an uplink power control method and device based on a genetic algorithm in a communication network are proposed. The introduction of the genetic algorithm into the research of the power control makes full use of the powerful global search and optimization capabilities of the algorithm, and achieves system stability and reduces the transmission power of a mobile terminal as much as possible on the premise that certain complexity is ensured, without impacting the QoS of a normal uplink in a wireless communication system. This algorithm has outstanding features such as self-organisation, self-adaptation and parallelism, and it is a global optimization technique. At the same time, compared with other search algorithms (such as gradient-based search algorithms), the genetic algorithm does not need derivation and other supporting knowledge, and can find an optimal solution for the problem in the entire solution space only by determining a target function in the direction of search and a corresponding fitness function as well as a genetic operator. The embodiments of the disclosure are substantially applicable to a homogeneous network or a heterogeneous network of wireless communications and provide a new thought for power control solutions in the communication networks.

The embodiments of the disclosure utilize the powerful global search capability of the genetic algorithm to search for an optimal solution of the power control problem meeting a preset fitness function in the space range of power solutions, further propose an uplink power control method based on a genetic algorithm in a communication network. The embodiment of the disclosure belong to a random search power control technology compared with the traditional power control technologies. The transmission power of a mobile terminal in the uplink is adjusted duly by means of power control technologies, thereby ensuring the QoS of the uplink of a target base station and decreasing the interference influences to other base stations as much as possible. Compared with common power control algorithms in the existing communication networks, the power control algorithm provided in the embodiments of the disclosure has common features such as low complexity, high search efficiency and good stability which make the algorithm to be applicable to various scenarios, and also provides a new thought for the effective control of the interference management of the homogeneous network and heterogeneous network.

As shown in FIG. 1, which is an approximate schematic flowchart of the genetic algorithm, the power control method includes the steps of:

step one, an actual problem parameter set, presetting the number of initial populations;

step two, randomly generating binary data strings of 0, 1 for all the populations of the $t^{th}$ generation;

step three, encoding the randomly generated binary data of all the populations of the $t^{th}$ generation;

step four, decoding the randomly generated binary data of all the populations of the $t^{th}$ generation;

step five, designing a fitness function satisfying the algorithm;

step six, evaluating all the individual populations;

step seven, screening an optimal solution, and determining whether it is used for the next generation of computation, and if yes, returning to step one; otherwise, executing step eight; and step eight, obtaining an output of a final improved solution to the actual problem.

The solutions provided in the embodiments of the disclosure can be realized in a homogeneous network and can also be realized in a heterogeneous network. There will be some differences in the computation of interferences and the issue of power control signalling in different network standards. In order to facilitate basic description of the principles of the technical solutions, the introduction of the technical solutions here takes an UMTS (Universal Mobile Telecommunications System) network as an example.

Step 1: firstly, the UMTS network is modelled to obtain a derivation formula of a theoretically optimal transmission power of the system:

it is assumed that there are M mobile terminals in an active state in a wireless communication system, and it is assumed that a link gain $G_{ij}$ between a mobile terminal j and a base station i is constant at any moment. If the mobile terminal i is in communication with the base station n, then the power of the interference and noise received at the base station n relative to the mobile terminal i is:

$$I_i = \sum_{j=1, j \neq i}^{M} G_{nj} p_j + \delta_n \tag{1}$$

where P represents the transmission power of a certain mobile terminal currently, which is a scalar; and $\delta_n$ is a heat noise power at the base station n. On the basis of the principle of the algorithm of the communication link quality, if the ratio of the power of a signal of the mobile terminal i received at the base station n to the power of interference plus noise (SIR) is greater than or equal to a preset target value $\gamma'_i$ which is required, then the terminal considers that the signal of the mobile terminal i can be received correctly, and thus there is the following derivation of the mobile terminal i:

$$\frac{G_{ni} \times p_i}{I_n} \geq \gamma'_i \qquad (2)$$

By combining (1) and (2), it can be obtained that the transmission power of the mobile terminal i should satisfy the relational expression:

$$p_i \geq \sum_{j=1, j \neq i}^{M} \frac{G_{nj}}{G_{ni}} \times p_j \times \gamma'_i + \frac{\delta_i}{G_{ni}} \times \gamma'_i \qquad (3)$$

In addition, considering that the transmission power of the mobile terminal is limited, it can be expressed with the following formulae:

$$0 \leq p_i \leq p_{i\_max};$$

where $p_{i\_max}$ is the maximum value of the transmission power of the mobile terminal i. The above formulae is overwritten in the matrix form:

$$P = HP + \eta;$$

where vector $P = [P_1, P_2, P_3, \ldots P_M]^T$ represents a transmission power vector of the mobile terminal; matrix $H = \lfloor h_{nj} \rfloor$ is an M×M normalized link gain matrix, especially, when i≠j, $$h_{nj} = (G_{nj} / G_{ni}) \times \gamma'_i;$$

and when i=j, $h_{nj}$=0; and vector $$\eta = (\delta_n / G_{ni}) \times \gamma'_i$$

is a normalized noise power vector. The vector expression of a theoretically optimal transmission power of the system is obtained by collation:

$$\hat{P} = (I - H)^{-1} \eta \qquad (4)$$

Step 2: by combining the genetic algorithm with power control, the fitness function is determined.

Parallel search based on chromosome populations has a selection operation, an exchange operation and a mutation operation which have conjecture natures. This special combination mode distinguishes the genetic algorithm from other search algorithms. The search for an appropriate assumption starts from several populations or sets of initial assumptions. Basic terms of the genetic algorithm and relationships between relevant variables of power control are described as follows.

(1) Chromosome

The chromosome can also be called a gene individual, a certain amount of individuals form a population, and the number of individuals in the population is called the size of the population. The vector of the transmission power $P = [p_i]^T$ in the embodiments of the disclosure is constituted by transmission powers $p_i$ (i=1, 2, 3 . . . M) of various mobile terminals, for example, such a group of vectors like $[p_1, p_2, p_3, p_4]^T$ is called one chromosome. An initial population can be selected randomly from the value range of the solutions to serve as the first generation of the population.

(2) Gene

The gene is an element in a chromosome string, and the gene is used for representing the feature of an individual. For example, $P_1$ in $[p_1, p_2, p_3, p_4]^T$ is one gene; one string is S=1011, then four elements 1, 0, 1, 1 therein are respectively called genes. The values thereof are called alleles. It can be seen that the gene of the chromosome is the transmission power that each user in the system needs to use.

(3) Fitness Function

The fitness degree of each individual to the environment is called fitness. In order to embody the fitness capability of the chromosome, a function which can measure each chromosome in the problem is introduced and this function is called a fitness function. This function is to calculate the probability that the individual is used in the population, which is an index for evaluating the quality of the individual in the population, and it is evaluated according to the target function of the problem to be solved. In the search evolution process, other extrinsic information is unnecessary generally, and only an evaluation function is used to evaluate the quality of the individual or solution which serves as the basis for the next generation of genetic operations. Since in the genetic algorithm, the fitness function needs to perform the comparison and ordering, and calculate a selection probability on the basis of the comparison and ordering, the value of the fitness function should be a positive value. It is very important to select and determine the fitness function, because it directly impacts the performance of the genetic algorithm. By combining the fundamental principles and fundamental goals of power control, for the uplink in a communication system, the system capacity of the target base station is maximized, and at the same time, the power consumption of the mobile terminal is reduced as much as possible by means of power control, thereby ensuring the system stability and the QoS of the communication uplink. On the basis of these several points of comprehensive consideration, the fitness function selected in the embodiments of the disclosure is as shown below:

$$\mu(t) = \sum_{i=1}^{M} [p_i(t) + \phi(t)] \qquad (5)$$

where $\phi(t) = p_i(t) - p_i(t-1)$, and it is required that the fitness function should be as small as possible.

In addition, the function also has two constraint conditions:
for a demodulation threshold of an SINR of a received signal:

$$\frac{G_{ni} \times p_i}{I_i} \geq \gamma'_i;$$

and
for the transmission power of the mobile terminal:

$$0 \leq p_i(t) \leq p_{i\_max};$$

$p_i(t)$ represents the transmission power of the $i^{th}$ user in the $t^{th}$ generation (i.e. the moment t); $I_i$ represents the sum of the power of the interference and noise received by the $i^{th}$ user, and $\gamma'_i$ represents the target signal to interference ratio of the $i^{th}$ user. By means of the integration of the above formula, a value range of the searching for the transmission power is obtained:

$$\left(\frac{\gamma'_i \times I_i}{G_{ni}}\right) \le p_i(t) \le p_{i\_max} \quad (6)$$

where it is assumed that the link gain $G_{ni}$ between the mobile terminal i and the base station n can be obtained at any moment and the link gain $G_{ni}$ is constant; the current base station n can obtain a total power of the interference signal; and the noise power is a known value. Thus, the value range of power is definite at a certain moment.

Step 3: an encoding method is determined.

Since the genetic algorithm can adopt a fixed binary symbol string to represent an individual in a population, of which the allele is composed by a binary symbol set {0, 1}. The gene values of the individuals in the initial population can be generated using random-uniform numbers, and the lengths of the genes thereof are related to the required accuracy. The value range of the variable in the present embodiment is given by formula (6), assuming that the lower limit is set to $$\alpha = \frac{\gamma'_i \times I_i}{G_{ni}},$$

then the interval of the variable is $\lfloor \alpha, p_{i\_max} \rfloor$. The accuracy is selected to the $n^{th}$ decimal places temporarily, and this also means that each variable may be divided into at least $(p_{i\_max} - \alpha) \times 10^n$ parts. For the number of bits of a binary string of one variable (denoted by $m_j$), it is calculated using the following formula:

$$2^{m_j-1} < (p_{i\_max} - \alpha) \times 10^n \le 2^{m_j} - 1 \quad (7)$$

The number of bits obtained in the above formula is the length of one gene, and the length of the chromosome is equal to the length of each gene multiplying the number of genes.

Step 4: populations are initialized.

The initial population is selected randomly from the range of the solution, and these solutions are compared to chromosomes or genes, and this population is called the first generation.

In the present embodiment, on the basis that the length of the chromosome is obtained in step 3, with regard to the generation of 0 and 1 chromosome strings based on this length, K groups can be generated randomly, according to the number of initial populations set in advance, to satisfy the requirements. Here the initial population can be denoted as $U_k$. In addition, a certain time period T needs to be set (it can be determined according to particular scenarios), if the processing period exceeds T, the system needs to restart execution from step 3, the number of bits $m_j$ of the binary string is calculated. If the calculated $m_j$ is the same as an $m_j$ calculated in a previous period, then an optimal solution obtained by means of iteration in the previous period can continue to be adopted and an initial population for a next period can be generated by means of operations of crossover and mutation. If the $m_j$ has changed, then a new $m_j$ length needs to be generated again to initialize a random population.

Step 5: a decoding method is determined.

An actual value can be returned from the binary string to serve as an actual variable, and this process can be realized by adopting the following formulae:

$$p_i = \alpha + \text{decimal(substring)} \times \frac{p_{i\_max} - \alpha}{2^{m_j} - 1} \quad (8)$$

where decimal(substring) represents a decimal numerical value of the variable $P_i$.

Step 6: an individual evaluation method is determined.

The most robust gene and the weakest gene in a chromosome are obtained according to the fitness function, a genetic operator is designed and operating parameters of the genetic algorithm are determined.

For example, the embodiments of the disclosure select to use roulette wheel selection, that is, fitness proportion selection. During particular implementation, this method is not the optimal algorithm, but it is the simplest and most commonly used selection method. In the method, the selection probability of each individual is proportional to the fitness value thereof. During the roulette wheel selection, each individual is similar to a small sector in the roulette wheel, the size of the sector being in direct proportion to the probability that the individual is selected. The probability that the individual having a larger sector is selected is larger, and this is the roulette wheel selection in which a new population is selected by means of basic probability distribution. The approximate steps include:

1) calculating the fitness function $\text{eval}(U_k)$ according to a decimal numerical value $U_k$ corresponding to each randomly generated binary chromosome, wherein this parameter K mainly embodies the random controllability of the genetic algorithm and the initial value of this parameter may be configured artificially:

$$\text{eval}(U_k) = \mu(t) k = 1, 2, 3, \ldots \quad (9);$$

2) calculating a sum of the fitness of the populations:

$$F = \sum_{k=1}^{K} \text{eval}(U_k); \quad (10)$$

3) calculating a selection probability $Y_k$ corresponding to the $U_k$ of each chromosome:

$$Y_k = \frac{\text{eval}(U_k)}{F}; \quad (11)$$

4) calculating an accumulation probability $Q_k$ of the $U_k$ of each chromosome:

$$Q_k = \sum_{j=1}^{k} Y_j \quad k = 1, 2, 3 \ldots, K; \quad (12)$$

and 5) in a particular implementation process, completing the selection of one chromosome of a new population in accordance with the steps of:

(1) rotating a roulette wheel K times, with one random number r between [0, 1] being generated by each rotation, r being denoted as a vector having a size of 1×K;

(2) performing screening once utilizing each element of the random number vector to obtain one new population satisfying conditions corresponding to a current random number, if the current random number $r_i \leq Q_1$, then directly selecting this population of the chromosome $U_1$ as an optimal solution selected by the random number; and if $r_i \leq Q_1$ is not satisfied, then comparing whether $Q_k \leq r_i \leq Q_{k+1}$ is satisfied, then selecting a $k^{th}$ initial population, traversing each element in a random number matrix r in sequence, performing recursion until the comparison of all the random numbers is completed, and selecting the $k^{th}$ group of initial population which has the maximum probability of occurrence to serve as an optimum transmission power at current moment t; and (3) if the selected new population $U_k$ is not unique, then a plurality of current groups of $U_k$ needing to be compared by combining again with the selection probabilities, and taking a $U_k$ which has the minimum selection probability as an output of the optimal population of this time. Since the new population is an optimal chromosome inherited from a previous generation during the selection of an optimal population for a next generation, operations such as crossover and mutation being performed again based on this can serve as the method for obtaining a randomly generated initial population for the next generation. There are many cross operator mutation methods, which will not be deeply discussed herein.

Figure 2:
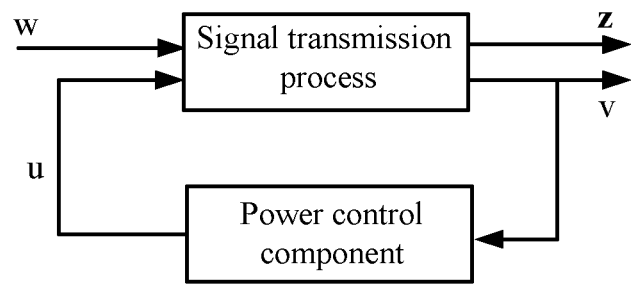
FIG. 2 is a schematic diagram showing the power control of an uplink power control device based on a genetic algorithm in a communication network provided in an embodiment of the disclosure.

As shown in FIG. 2, assuming that one link from a base station to a mobile station has been established, then the power control will come down to the problem of how to update the transmission power of a transmitter.

An external input W includes a channel gain $G_{ii}$ and an interference $I_i(t)$ (including a heat noise $\delta_i$); a control signal u refers to the power $p_i(t)$ of the signal transmitted by the user; a measurement parameter of power control is denoted by v, which generally includes the measurement based on the communication quality or based on the received signal strength; and z represents a specific quality measurement parameter of the service, for example, a bit error rate, etc., and this is obtained by means of long-time measurement.

Embodiment 1

Figure 3:
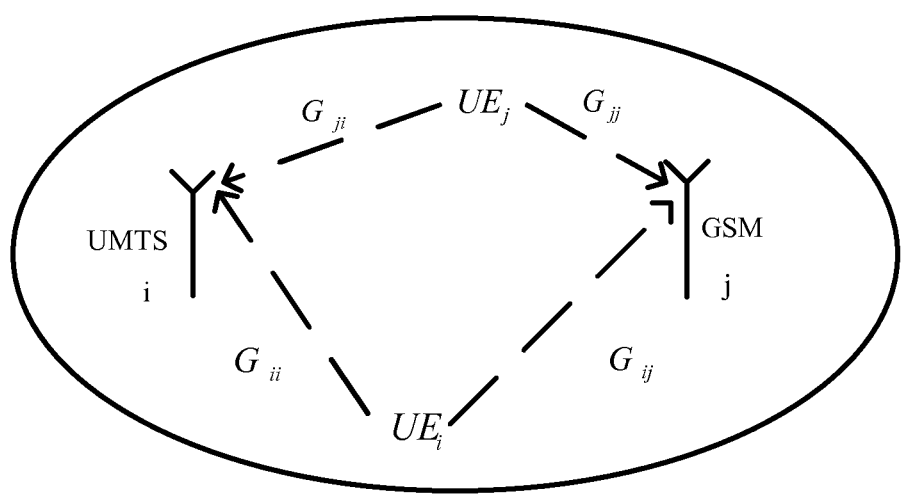
FIG. 3 is a schematic diagram of hybrid networking of a UMTS and a GSM in embodiment one of the disclosure.

The implementation method of the disclosure in a heterogeneous network is illustrated below by means of particular embodiments in combination with FIG. 3, the present embodiment is based on the scenario of hybrid networking of a UMTS and a GSM, and the uplink interference of the GSM base station is taken as an example for illustration in the research temporarily.

The UMTS system adopts the WCDMA technology and mutual interferences exist between users in the UMTS system and the traditional GSM system, for any user, the interferences come from all the other users except this user. It is assumed that the base station deploying the UMTS is denoted by i, and the GSM base station is denoted by j. It is supposed that there are M mobile terminals in the active state under the UMTS base station, and there are N mobile terminals in the active state under the GSM base station. Wireless link gains between the mobile terminal i belonging to the UMTS base station and the mobile terminal j belonging to the GSM base station and the UMTS and GSM base stations at any moment are respectively $G_{ii}$, $G_{jj}$, $G_{ij}$, $G_{ji}$ and can be considered to be constant within a certain time.

Step 1: a decision-making variable and constraint conditions are determined.

The power of interference and noise received at the GSM base station j is:

$$I_j = \sum_{m=1}^{M} P_m^{umts} \times G_{m,i} + \sum_{n=1, n \neq j}^{N} P_n^{gsm} \times G_{n,j} + \delta_j;$$

where $P_m^{umts}$ is the transmission power of a user under the UMTS base station, $P_n^{gsm}$ is the transmission power of a user under the GSM base station, and $\delta_j$ is the heat noise power at the base station j. On the basis of the algorithm principle of the quality of a communication link, if the ratio of the power of a signal of the mobile terminal j received at the base station j to the power of interference plus noise (SINR) is greater than or equal to a required target value $\gamma_j^t$, that is:

$$\frac{G_{jj} P_j^{gsm}}{I_j} \geq \gamma_j^t;$$

Constraint Conditions:

(1) The maximum transmission power of the UL of each UE in the UMTS cannot exceed $P_{max}^{umts}$; and (2) The maximum transmission power of the UL of each UE in the GSM cannot exceed $P_{max}^{gsm}$;

The formula derivation of the transmission power of each mobile terminal j in the GSM network should satisfy the relational expression:

$$P_j^{gsm} \geq \gamma_j^t \left( \sum_{n=1, n \neq j}^{N} P_n^{gsm} \times \frac{G_{n,j}}{G_{jj}} + \sum_{m=1}^{M} P_m^{umts} \times \frac{G_{m,j}}{G_{jj}} \right) + \eta$$

that is, the expression of the optimal transmission power solution of the system is:

$$P^{gsm} = (I-H)^{-1} \times (H_u \times P^{umts} + \eta) \quad (13)$$

where vectors $P^{gsm} = [P_1, P_2, P_3, \ldots, P_N]^T$ and $P^{umts} = [P_1, P_2, P_3, \ldots P_M]^T$ respectively represent transmission power vectors of the mobile terminals in the GSM network and the UMTS network; matrix $H = [h_{nj}]$ is an N×N normalized link gain matrix, especially, when n≠j, $$h_{nj} = \frac{G_{nj}}{G_{jj}} \times \gamma_j^t;$$

and when n=j, $h_{ij}=0$; $H_u = [h_{mi}]$ is an M×M normalized link gain matrix, $$h_{mi} = \frac{G_{mi}}{G_{jj}} \times \gamma_j^t,$$

and vector $$\eta = \gamma_j^t \times \frac{\delta_j}{G_{jj}}$$

is a normalized noise power vector. The base station of the GSM system can measure the sum of the power of all the received signals, and can also obtain the sum of interferences thereto of all the users under the base station of the UMTS. Therefore, the theoretically optimal transmission power can be obtained; in addition, the search range of the transmitting power of the terminal can also be determined.

Step 2: by combining the genetic algorithm with the power control, the fitness function is determined.

For the uplink, power control is to minimize the power consumption of the user terminal, and at the same time, maximize the system capacity, ensure the stability of the system and ensure the QoS of the link. Therefore, the selected fitness function is as follows:

$$\mu(t) = \sum_{j=1}^{N} [P_j^{gsm}(t) + \phi(t)] \quad (14)$$

where $\phi(t)=P_j^{gsm}(t)-P_j^{gsm}(t-1)$, and it is required that the fitness function should be as small as possible. In addition, due to the requirement for the demodulation threshold of the SINR of the received signal and the transmission power of the terminal being limited, the constraint condition is:

$$\frac{G_{jj} P_j^{gsm}}{I_j} \geq \gamma_j^t, \, 0 \leq P_j^{gsm}(t) \leq P_{max}^{gsm};$$

$P_j(t)$ represents the transmission power of the $j^{th}$ user in the $t^{th}$ generation; $I_j$ represents the sum of the power of the interference and noise received by the $j^{th}$ user, and $\gamma'_j$ represents the target signal to interference ratio of the $j^{th}$ user in the $t^{th}$ generation.

Step 3: an encoding method is determined.

It is assumed that the lower limit is set to $$\alpha = \frac{\gamma_j^t \times I_j}{G_{jj}},$$

the GSM base station can receive the overall received power of all the mobile terminals, then the power of the current is subtracted therefrom to obtain the total of the interference signal power. Then the interval of the variable is [$\alpha$, $P_{max}^{gsm}$], and the accuracy is selected to the $n^{th}$ decimal places temporarily, and this also means that each variable may be divided into at least ($P_{max}^{gsm}-\alpha$)×$10^n$ parts. For the number of bits of a binary string of a variable (denoted by $m_j$), it is calculated using the following formula:

$$2^{m_j-1} < (P_{max}^{gsm}-\alpha) \times 10^n \leq 2^{m_j}-1 \quad (15)$$

The number of bits obtained in the above formula is the length of one gene, and the length of the chromosome is equal to the length of each gene multiplying the number of genes.

Step 4: populations are initialized.

The initial population is selected randomly from the range of the solution, and these solutions are compared to chromosomes or genes, and the population is called the first generation. In the embodiments of the disclosure, on the basis that the length of the chromosome is obtained in step 3, with regard to the generation of 0 and 1 chromosome strings based on this length, K groups can be generated randomly, according to the number of initial populations set in advance, to satisfy the requirements. Here the initial population can be denoted as $U_k$. In addition, a certain time period T needs to be set (it can be determined according to particular scenarios), if the processing period exceeds T, the system needs to restart execution from step 3, the number of bits $m_j$ of the binary string is calculated. If the calculated $m_j$ is the same as an $m_j$ calculated in a previous period, then an optimal solution obtained by means of iteration in the previous period can be continued to be adopted and an initial population for a next period can be generated by means of operations of crossover and mutation. If the $m_j$ has changed, then a new $m_j$ length needs to be generated again to initialize a random population.

Step 5: a decoding method is determined.

Returning an actual value from the binary string can be realized by adopting the following formulae:

$$P_j = \alpha + \text{decimal(substring)} \times \frac{P_{max}^{gsm}}{2^{m_j}-1} \quad (16)$$

where decimal(substring) represents a decimal numerical value of the variable $P_j$.

Step 6: an individual evaluation method is determined.

The embodiments of the disclosure select to use roulette wheel selection, and it is not the optimal algorithm but is the simplest and most commonly used selection method. The approximate steps include:

1) calculating the fitness function eval($U_k$) according to a decimal numerical value $U_k$ corresponding to each randomly generated binary chromosome, wherein this parameter K mainly embodies the random iteration controllability of the genetic algorithm and the initial value of this parameter may be configured artificially:

$$\text{eval}(U_k)=\mu(t)k=1,2,3,\ldots \quad (17);$$

2) calculating a sum of the fitness of the populations:

$$F = \sum_{k=1}^{K} \text{eval}(U_k); \quad (18)$$

3) calculating a selection probability $Y_k$ corresponding to the $U_k$ of each chromosome:

$$Y_k = \frac{\text{eval}(U_k)}{F}; \quad (19)$$

4) calculating an accumulation probability $Q_k$ of the $U_k$ of each chromosome:

$$Q_k = \sum_{j=1}^{k} Y_j \quad k=1,2,3\ldots,K; \quad (20)$$

and 5) in a particular implementation process, completing the selection of one chromosome of a new population in accordance with the steps of:

(1) rotating a roulette wheel K times, with one random number r between [0, 1] being generated by each rotation, r being denoted as a vector of 1×K;

(2) performing screening once utilizing each element of the random number vector to obtain one new population satisfying conditions corresponding to a current random number, if the current random number $r_i \leq Q_1$, then directly selecting this population of the chromosome $U_1$ as an optimal solution selected by the random number; and if $r_i \leq Q_1$ is not satisfied, then comparing whether $Q_k \leq r_i \leq Q_{k+1}$ is satisfied, then selecting a $k^{th}$ initial population, traversing each element in a random number matrix r in sequence, performing recursion until the comparison of all the random numbers is completed, and selecting the $k^{th}$ group of initial population which has the maximum probability of occurrence to serve as an optimum transmission power at current moment t; and (3) if the selected new population $U_k$ is not unique, then a plurality of current groups of $U_k$ needing to be compared by combining again with the selection probabilities, and taking a $U_k$ which has the minimum selection probability as an output of the optimal population of this time. The new population is an optimal chromosome inherited from a previous generation during the selection of an optimal population for a next generation, operations such as crossover and mutation being performed again based on this can serve as the method for obtaining a randomly generated initial population for the next generation. There are many cross operator mutation methods, which will not be deeply discussed herein.

Embodiment 2

Figure 4:
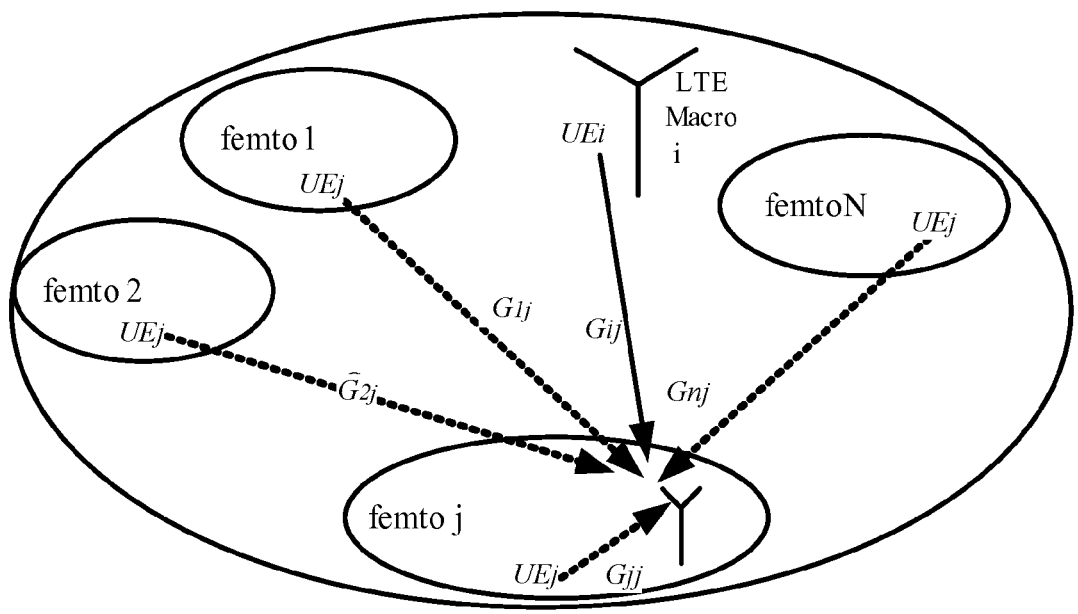
FIG. 4 is a schematic diagram of the networking of a plurality of femtoes deployed under a macro base station of an LTE system in embodiment two of the disclosure.

The disclosure is illustrated by means of particular embodiments in combination with FIG. 4, and the scenarios of blind compensation and heat compensation being implemented by deploying a plurality of femtoes under one macro station in an LTE system is taken as an example for illustration.

Uplink in the LTE system adopts the SC-FDMA technology, that is to say, subcarriers are mutually orthogonal, and it is assumed that frequency information about M UE under the macro base station is:

$$F_{lte} = [{}^1f, {}^2f \ldots {}^Mf].$$

Step 1: a decision-making variable and constraint conditions are determined.

The femto and macro base station adopt a common-frequency station distribution method, then on a certain frequency point, mutual interferences will be generated between users under the femto adopting the frequency point and users under the macro base station adopting the frequency point, while no interference exists between users which are not at the common frequency points. It is assumed that N femtoes are deployed and the macro base station is denoted as i; the $j^{th}$ femto is taken as an example, the uplink interferences that this femto is subjected to are all interference signals coming from users in other cells adopting the common frequency point, with the expression of:

$$I_j = \sum_{n=1, n \neq j}^{N} P_n^f \times G_{nj} + P_i^m \times G_{ii} + \delta_j \quad (21)$$

where $P_j^f$ and $P_i^m$ respectively represent the transmission power of the UE at a certain frequency point under the femto and the transmission power of the UE at the common frequency point under the macro base station; and $G_{nj}$ represents link gains of common-frequency users in other femtoes to the $j^{th}$ home base station, $G_{ii}$ represents link gains of users i at the common frequency point under the macro base station, and $\delta_j$ represents the heat noise power at the femto j. If the ratio of the power of a signal of the mobile terminal j received at the base station j to the power of the interference plus noise (SINR) is greater than or equal to a required target value $\gamma^t_j$, that is:

$$\frac{G_{jj} P_j^f}{I_j} \geq \gamma^t_j;$$

Constraint Conditions:

(1) The maximum transmission power of the UL of each UE in the LTE cannot exceed $P_{max}^m$; and (2) The maximum transmission power of the UL of each UE in the femto cannot exceed $P_{max}^f$;

It can be obtained that the transmission power of the mobile terminal j adopting the common frequency under the femto j should satisfy the relational expression:

$$P_j^{*f} = \sum_{n=1, n \neq j}^{N} P_n^f \times \frac{G_{nj} \times \gamma^t_j}{G_{jj}} + P_i^m \times \frac{G_{ij} \times \gamma^t_j}{G_{jj}} + \eta \quad (21)$$

where $P_j^{*f}$ represents an optimal transmission power of the mobile terminal at the common frequency point under the femto j, vector $$\eta = \left[\left(\frac{\delta_i}{G_{ii}}\right) \times \gamma^t_j\right]$$

is a normalized noise power vector, and $P_i^m$ is the transmission power of a terminal adopting the common frequency point under the macro base station. The femto j can measure the total of the received signal power, then the valuable signal power under the current target base station is subtracted therefrom to obtain the total of the interference signal power. Therefore, the optimal transmission power of the mobile terminal at the frequency point under the femto j can be obtained theoretically. $G_{nj}$ is a link gain from a terminal at a certain frequency point to the femto j, which is assumed to be constant for a period of time.

Step 2: by combining the genetic algorithm with the power control, the fitness function is determined.

For the uplink, power control is to minimize the power consumption of the user terminal, and at the same time, maximize the system capacity, ensure the stability of the system and ensure the QoS of the uplink. Therefore, the fitness function can be simplified as:

$$\mu(t) = P_j^f(t) + \phi(t) \quad (22)$$

where $\phi(t) = P_j^f(t) - P_j^f(t-1)$, and it is required that the fitness function should be as small as possible. In addition, due to the requirement for the demodulation threshold of the SINR of the received signal and the transmission power of the terminal being limited, the constraint conditions are:

$$\frac{G_{jj} P_j^f}{I_j} \geq \gamma^t_j$$

and $0 \leq P_j^f(t) \leq P_{max}^f$;

wherein $P_j^f(t)$ represents the transmission power of the $j^{th}$ femto in the $t^{th}$ generation; Ij represents the sum of the power of the interference and noise received by the $j^{th}$ home base station, and $\gamma^t_j$; represents the target signal to interference ratio of the $j^{th}$ user in the $t^{th}$ generation.

Step 3: an encoding method is determined.

It is assumed that the lower limit is set to $$\alpha = \frac{\gamma^t_j \times I_j}{G_{jj}},$$

then the interval of the variable is $[\alpha, P_{max}^f]$, and the accuracy is selected to the $n^{th}$ decimal places temporarily, and this also means that each variable may be divided into at least $(P_{max}^f-\alpha)\times 10^n$ parts. For the number of bits of a binary string of a variable (denoted by $m_j$), it is calculated using the following formula:

$$2^{m_j-1} \leq (P_{max}^f-\alpha)\times 10^n \leq 2^{m_j}-1 \quad (23)$$

The number of bits obtained in the above formula is the length of one gene, and the length of the chromosome is equal to the length of each gene multiplying the number of genes.

Step 4: populations are initialized.

The initial population is selected randomly from the range of the solution, and these solutions are compared to chromosomes or genes, and the population is called the first generation. In the present embodiment, on the basis that the length of the chromosome is obtained in step 3, with regard to the generation of 0 and 1 chromosome strings based on this length, K groups can be generated randomly, according to the number of initial populations set in advance, to satisfy the requirements, here the initial population can be denoted as $U_k$. In addition, a certain time period T needs to be set (it can be determined according to particular scenarios), if the processing period exceeds T, the system needs to restart execution from the above-mentioned step 3, the number of bits $m_j$ of the binary string is calculated. If the calculated $m_j$ is the same as an $m_j$ calculated in a previous period, then an optimal solution obtained by means of iteration in the previous period can be continued to be adopted and an initial population for a next period can be generated by means of operations of crossover and mutation. If the $m_j$ has changed, then a new $m_j$ length needs to be generated again to initialize a random population.

Step 5: a decoding method is determined.

An actual value is returned from the binary string, and this process can be realized by adopting the following formulae:

$$P_j^f = \alpha + \text{decimal(substring)} \times \frac{P_{max}^f}{2^{m_j}-1} \quad (24)$$

where decimal(substring) represents a decimal numerical value of the variable $P_j^f$.

Step 6: an individual evaluation method is determined.

The present embodiment still selects to use roulette wheel selection, and it is not the optimal algorithm but is the simplest and most commonly used selection method, and it includes the following particular steps:

1) calculating the fitness function eval($U_k$) according to a decimal numerical value $U_k$ corresponding to each randomly generated binary chromosome, wherein this parameter K mainly embodies the random iteration controllability of the genetic algorithm and the initial value of this parameter may be configured artificially:

$$\text{eval}(U_k)=\mu(t) k=1,2,3,\ldots \quad (25);$$

2) calculating a sum of the fitness of the populations:

$$F = \sum_{k=1}^{K} \text{eval}(U_k); \quad (26)$$

3) calculating a selection probability $Y_k$ corresponding to the $U_k$ of each chromosome:

$$Y_k = \frac{\text{eval}(U_k)}{F}; \quad (27)$$

4) calculating an accumulation probability $Q_k$ of the $U_k$ of each chromosome:

$$Q_k = \sum_{j=1}^{k} Y_j \quad k=1,2,3\ldots,K; \quad (28)$$

and 5) in a particular implementation process, completing the selection of one chromosome of a new population in accordance with the steps of:

(1) rotating a roulette wheel K times, and one random number $r_k$ between [0, 1] is generated by each rotation, and $r=[r_1, r_2, r_3, \ldots r_K]$ is denoted as a vector of 1×K;

(2) performing screening once utilizing each element of the random number vector to obtain one new population satisfying conditions corresponding to a current random number, if the current random number $r_i \leq Q_1$, then directly selecting this population of the chromosome $U_1$ as an optimal solution selected by the random number; and if $r_i \leq Q_1$ is not satisfied, then comparing whether $Q_k \leq r_i \leq Q_{k+1}$ is satisfied, then selecting a $k^{th}$ initial population, traversing each element in a random number matrix r in sequence, performing recursion until the comparison of all the random numbers is completed, and selecting the $k^{th}$ group of initial population which has the maximum probability of occurrence to serve as an optimum transmission power at current moment t; and (3) if the selected new population $U_k$ is not unique, then a plurality of current groups of $U_k$ needing to be compared by combining again with the selection probabilities, and taking a $U_k$ which has the minimum selection probability as an output of the optimal population of this time. The new population serves as an optimal chromosome inherited from a previous generation during the selection of an optimal population for a next generation, operations such as crossover and mutation being performed again based on this can serve as the method for obtaining a randomly generated initial population for the next generation. There are many cross operator mutation methods, which will not be deeply discussed herein.

Any equivalent replacements of the structure or the flow based on the contents of the specification and drawings of the disclosure, or direct or indirect application of the equivalent replacements in other related technical fields shall fall within the scope of protection defined by the appended claims of the disclosure.

What is claimed is:

1. An uplink power control method based on a genetic algorithm in a communication network, comprising:
   A. modelling a communication network to acquire a theoretically optimal transmission power expression of a mobile terminal;

B. determining a fitness function in combination of a genetic algorithm;
C. determining the numbers of bits of binary strings of variables;
D. initializing populations;
E. returning an actual value from the binary string to serve as an actual variable; and
F. obtaining the most robust gene and the weakest gene in a chromosome according to the fitness function, and designing a genetic operator and determining operating parameters of the genetic algorithm according to the most robust gene and the weakest gene;
wherein, in the step F, roulette wheel selection is adopted to obtain the most robust gene and the weakest gene in the chromosome according to the fitness function, and the genetic operator is designed and the operating parameters of the genetic algorithm are determined according to the most robust gene and the weakest gene, the step F comprises:
F1, calculating the fitness function eval($U_k$) according to a decimal numerical value $U_k$ corresponding to each randomly generated binary chromosome, wherein this parameter K is mainly used for embodying random controllability of the genetic algorithm and an initial value of this parameter is artificially configurable:

$$\text{eval}(U_k) = \mu(t) \, k = 1, 2, 3, \ldots;$$

F2, calculating a sum of the fitness of the populations:

$$F = \sum_{k=1}^{K} \text{eval}(U_k);$$

F3, calculating a selection probability $Y_k$ corresponding to the $U_k$ of each chromosome:

$$Y_k = \frac{\text{eval}(U_k)}{F};$$

F4, calculating an accumulation probability $Q_k$ of the $U_k$ of each chromosome:

$$Q_k = \sum_{j=1}^{k} Y_j \quad k = 1, 2, 3 \ldots, K;$$

and
F5, selecting one chromosome of a new population.

2. The uplink power control method based on a genetic algorithm in a communication network as claimed in claim 1, wherein, in the step A, a vector expression of the theoretically optimal transmission power of the mobile terminal $\hat{P}$ is:

$$\hat{P} = (I - H)^{-1} \eta;$$

where matrix $H = \lfloor h_{nj} \rfloor$, which is an M×M normalized link gain matrix; vector $$\eta = \left( \frac{\delta_n}{G_{ni}} \right) \times \gamma'_i,$$

which is a normalized noise power vector, where $\delta_n$ is a heat noise power at a base station n, $G_{ni}$ is a link gain between the $i^{th}$ mobile terminal and the base station n at a certain moment, and $\gamma'_i$ is a target signal to interference ratio (SIR) of the $i^{th}$ mobile terminal.

3. The uplink power control method based on a genetic algorithm in a communication network as claimed in claim 1, wherein, in the step B, for an uplink of a communication system, the determined fitness function is as follows:

$$\mu(t) = \sum_{i=1}^{M} [p_i(t) + \phi(t)];$$

where $\phi(t) = p_i(t) - p_i(t-1)$, and $p_i(t)$ represents a transmission power of the $i^{th}$ mobile terminal at the $t^{th}$ generation;
constraint conditions of the fitness function are:
for a demodulation threshold of a signal to interference and noise ratio (SINR) of a received signal:

$$\frac{G_{ni} \times p_i}{I_i} \geq \gamma'_i;$$

and
for the transmission power of the mobile terminal:

$$0 \leq p_i(t) \leq p_{i\_max};$$

where $I_i$ represents a sum of the power of interference and noise received by the $i^{th}$ mobile terminal, $\gamma'_i$ represents the target SIR of the $i^{th}$ mobile terminal, and $p_{i\_max}$ is a value of the transmission power of the $i^{th}$ mobile terminal;
a value range of searching for the transmission power is obtained as follows:

$$\left( \frac{\gamma'_i \times I_i}{G_{ni}} \right) \leq p_i(t) \leq p_{i\_max}.$$

4. The uplink power control method based on a genetic algorithm in a communication network as claimed in claim 3, wherein, in the step C, the number of bits $m_j$ of the binary string of each variable is acquired by the following mathematical formulae:

$$2^{m_j - 1} < (p_{i\_max} - \alpha) \times 10^n \leq 2^{m_j} - 1;$$

where a lower limit value of searching values for the variable is $$\alpha = \frac{\gamma'_i \times I_i}{G_{ni}}$$

and the value range of the searching values for the variable is $\lfloor \alpha, p_{i\_max} \rfloor$, and when the accuracy of determination is the $n^{th}$ decimal places, each variable is divided into at least $(p_{i\_max} - \alpha) \times 10^n$ parts.

5. The uplink power control method based on a genetic algorithm in a communication network as claimed in claim 4, wherein the calculated number of bits $m_j$ of the binary string of each variable is the length of each gene, and the length of the chromosome is equal to the length of each gene multiplying the number of genes;
in the step D, an initial population is determined randomly from the range of solutions; and on the basis that the length of the chromosome has been obtained, with regard to the generation of 0 and 1 chromosome strings based on this length, K groups are generated randomly according to a preset number of initial populations.

6. The uplink power control method based on a genetic algorithm in a communication network as claimed in claim 5, comprising: after a processing period has exceeded a preset time period T, moving on to step C to calculate the number of bits $m_j$ of the binary string, and if the calculated number of bits $m_j$ of the binary string is the same as an $m_j$ calculated in a previous period, then continuing to adopt an optimal solution obtained by means of iteration in the previous period and generate an initial population for a next period by means of operations of crossover and mutation; and if the $m_j$ has changed, then generating a new $m_j$ length again to initialize a random population.

7. The uplink power control method based on a genetic algorithm in a communication network as claimed in claim 1, wherein the communication network is a homogeneous network or a heterogeneous network.

8. The uplink power control method based on a genetic algorithm in a communication network as claimed in claim 1, wherein, in the step E, returning an actual value from the binary string to serve as the actual variable is realized by adopting the following formulae:

$$p_i = \alpha + \text{decimal(substring)} \times \frac{p_{i\_max} - \alpha}{2^{m_j} - 1};$$

where decimal(substring) represents a decimal numerical value of the variable $P_i$.

9. The uplink power control method based on a genetic algorithm in a communication network as claimed in claim 1, wherein the step F5 comprises:
F51, rotating a roulette wheel K times, with one random number r between [0, 1] being generated by each rotation, r being denoted as a vector having a size of 1×K;
F52, performing screening once utilizing each element of a random number vector to obtain one new population satisfying conditions corresponding to a current random number, if the current random number $r_i \leq Q_1$, then directly selecting the population of the chromosome $U_1$ as an optimal solution selected by the random number; and if $r_i \leq Q_1$ is not satisfied, then comparing whether $Q_k \leq r_i \leq Q_{k+1}$ is satisfied, if so, then selecting a $k^{th}$ initial population, traversing each element in a random number matrix r in sequence, performing recursion until the comparison of all the random numbers is completed, and selecting the $k^{th}$ group of initial population which has the maximum probability of occurrence to serve as an optimum transmission power at current moment t; and
F53, if the selected new population $U_k$ is not unique, then comparing a plurality of current groups of $U_k$ in combination of the selection probability, and taking a $U_k$ which has the minimum selection probability as an output of the optimal population of this time.

10. An uplink power control device based on a genetic algorithm in a communication network, comprising:
a power control component which is configured to model a communication network to acquire a theoretically optimal transmission power expression of a mobile terminal; determine a fitness function in combination of a genetic algorithm; determine the numbers of bits of binary strings of variables; initialize populations; return an actual value from the binary string to serve as an actual variable; and obtain the most robust gene and the weakest gene in a chromosome according to the fitness function, and design a genetic operator and determine operating parameters of the genetic algorithm according to the most robust gene and the weakest gene;
wherein the power control component is configured to adopt roulette wheel selection to obtain the most robust gene and the weakest gene in a chromosome according to the fitness function, and design the genetic operator and determine the operating parameters of the genetic algorithm according to the most robust gene and the weakest gene in the following way:
F1, calculating the fitness function eval($U_k$) according to a decimal numerical value $U_k$ corresponding to each randomly generated binary chromosome, wherein this parameter K is mainly used for embodying random controllability of the genetic algorithm and an initial value of this parameter is artificially configurable:

$$\text{eval}(U_k) = \mu(t) k = 1,2,3,\ldots;$$

F2, calculating a sum of the fitness of the populations:

$$F = \sum_{k=1}^{K} \text{eval}(U_k);$$

F3, calculating a selection probability $Y_k$ corresponding to the $U_k$ of each chromosome:

$$Y_k = \frac{\text{eval}(U_k)}{F};$$

F4, calculating an accumulation probability $Q_k$ of the $U_k$ of each chromosome:

$$Q_k = \sum_{j=1}^{k} Y_j \quad k = 1, 2, 3 \ldots, K;$$

and
F5, selecting one chromosome of a new population.

11. The uplink power control device based on a genetic algorithm in a communication network as claimed in claim 10, wherein a vector expression of the theoretically optimal transmission power of the mobile terminal $\hat{P}$ is:

$$\hat{P} = (I-H)^{-1} \eta;$$

where matrix $H=\lfloor h_{nj} \rfloor$, which is an M×M normalized link gain matrix; vector $$\eta = (\delta_n / G_{ni}) \times \gamma'_i,$$

which is a normalized noise power vector, where $\delta_n$ is a heat noise power at a base station n, $G_{ni}$ is a link gain between the $i^{th}$ mobile terminal and the base station n at a certain moment, and $\gamma'_i$ is a target signal to interference ratio (SIR) of the $i^{th}$ mobile terminal.

12. The uplink power control device based on a genetic algorithm in a communication network as claimed in claim 10, wherein, for an uplink of a communication system, the fitness function determined by the power control component is as follows:

$$\mu(t) = \sum_{i=1}^{M} [p_i(t) + \phi(t)],$$

where $\phi(t)=p_i(t)-p_i(t-1)$, and $p_i(t)$ represents a transmission power of the $i^{th}$ mobile terminal at the $t^{th}$ generation; constraint conditions of the fitness function are:
for a demodulation threshold of a signal to interference and noise ratio (SINR) of a received signal:

$$\frac{G_{ni} \times p_i}{I_i} \ge \gamma'_i;$$

and
for the transmission power of the mobile terminal:

$$0 \le p_i(t) \le p_{i\_max};$$

where $I_i$ represents a sum of the power of interference and noise received by the $i^{th}$ mobile terminal, $\gamma'_i$ represents the target SIR of the $i^{th}$ mobile terminal, and $p_{i\_max}$ is a maximum value of the transmission power of the $i^{th}$ mobile terminal;
a value range of searching for the transmission power is obtained as follows:

$$\left(\frac{\gamma'_i \times I_i}{G_{ni}}\right) \le p_i(t) \le p_{i\_max}.$$

13. The uplink power control device based on a genetic algorithm in a communication network as claimed in claim 12, wherein the number of bits $m_j$ of the binary string of each variable is acquired by the following mathematical formulae:

$$2^{m_j-1} < (p_{i\_max} - \alpha) \times 10^n \le 2^{m_j} - 1;$$

where a lower limit value of searching values for the variable is $$\alpha = \frac{\gamma'_i \times I_i}{G_{ni}}$$

and the value range of the searching values for the variable is $\lfloor \alpha, p_{i\_max} \rfloor$, and when the accuracy of determination is the $n^{th}$ decimal places, each variable is divided into at least $(p_{i\_max}-\alpha) \times 10^n$ parts.

14. The uplink power control device based on a genetic algorithm in a communication network as claimed in claim 13, wherein the calculated number of bits $m_j$ of the binary string of each variable is the length of each gene, and the length of the chromosome is equal to the length of each gene multiplying the number of genes;
an initial population is determined randomly from the range of solutions; and on the basis that the length of the chromosome has been obtained, with regard to the generation of 0 and 1 chromosome strings based on this length, K groups are generated randomly according to a preset number of initial populations.

15. The uplink power control device based on a genetic algorithm in a communication network as claimed in claim 14, re-calculating the number of bits $m_j$ of the binary string after a processing period has exceeded a preset time period T, and if the calculated number of bits $m_j$ of the binary string is the same as an $m_j$ calculated in a previous period, then continuing to adopt an optimal solution obtained by means of iteration in the previous period and generate an initial population for a next period by means of operations of crossover and mutation;
and if the $m_j$ has changed, then generating a new $m_j$ length again to initialize a random population.

16. The uplink power control device based on a genetic algorithm in a communication network as claimed in claim 10, wherein the communication network is a homogeneous network or a heterogeneous network.

17. The uplink power control device based on a genetic algorithm in a communication network as claimed in claim 10, wherein returning an actual value from the binary string to serve as the actual variable is realized by adopting the following formulae:

$$p_i = \alpha + \text{decimal}(\text{substring}) \times \frac{p_{i\_max} - \alpha}{2^{m_j} - 1};$$

where decimal(substring) represents a decimal numerical value of the variable $P_i$.

18. The uplink power control device based on a genetic algorithm in a communication network as claimed in claim 10, wherein the power control component is configured to execute the F5 in the following way:
F51, rotating a roulette wheel K times, with one random number r between [0, 1] being generated by each rotation, r being denoted as a vector having a size of 1×K;
F52, performing screening once utilizing each element of a random number vector to obtain one new population satisfying conditions corresponding to a current random number, if the current random number $r_i \le Q_1$, then directly selecting the population of the chromosome $U_1$ as an optimal solution selected by the random number; and if $r_i \le Q_1$ is not satisfied, then comparing whether $Q_k \le r_i \le Q_{k+1}$ is satisfied, if so, then selecting a $k^{th}$ initial population, traversing each element in a random number matrix r in sequence, performing recursion until the comparison of all the random numbers is completed, and selecting the $k^{th}$ group of initial population which has the maximum probability of occurrence to serve as an optimum transmission power at current moment t; and
F53, if the selected new population $U_k$ is not unique, then comparing a plurality of current groups of $U_k$ in combination of the selection probability, and taking a $U_k$ which has the minimum selection probability as an output of the optimal population of this time.

* * * * *